United States Patent
Jeddeloh

(12) 
(10) Patent No.: US 6,295,246 B2
(45) Date of Patent: *Sep. 25, 2001

(54) METHOD FOR RECEIVING DATA FROM A STORAGE DEVICE

(75) Inventor: Joseph M. Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/754,238

(22) Filed: Jan. 3, 2001

Related U.S. Application Data

(63) Continuation of application No. 09/206,793, filed on Dec. 7, 1998, now Pat. No. 6,181,638.

(51) Int. Cl.[7] .................................................. G06F 12/00
(52) U.S. Cl. ........................ 365/233; 711/104; 711/167; 713/600
(58) Field of Search ..................... 711/104, 105, 711/111, 167–169; 710/52, 55, 58, 61; 713/400, 501, 503, 600; 365/233

(56) References Cited

U.S. PATENT DOCUMENTS

| | | | |
|---|---|---|---|
| 5,487,092 | * | 1/1996 | Finney et al. .......................... 375/354 |
| 5,909,701 | * | 6/1999 | Jeddeloh ................................ 711/167 |
| 5,926,838 | * | 7/1999 | Jeddeloh ................................ 711/167 |
| 6,044,023 | * | 6/1999 | Proebsting ........................ 365/189.01 |

* cited by examiner

Primary Examiner—Kevin Verbrugge
(74) Attorney, Agent, or Firm—Park, Vaughan & Fleming LLP

(57) ABSTRACT

One embodiment of the present invention provides a method for receiving data from a synchronous random access memory. This method receives a stream of data along with a data clock signal from the synchronous random access memory. This stream of data is alternately clocked into a first memory register and a second memory register using the data clock signal. At the same time, data is alternately clocked from the first memory register into a first system register, and from the second memory register into a second system register using a slower-speed system clock. These data transfers are coordinated so that data transfers from the synchronous random access memory into the memory registers do not interfere with data transfers from the memory registers into the system registers. More specifically, the method ensures that the first memory register is loaded from the synchronous random access memory while the data is being transferred from the second memory register into the second system register. On alternate cycles the method ensures that the second memory register is loaded from the synchronous random access memory while data is being transferred from the first memory register into the first system register. In a variation on this embodiment, the first and second memory registers are composed of a plurality of separately-clocked data words.

20 Claims, 5 Drawing Sheets

METHOD FOR RECEIVING DATA FROM A STORAGE DEVICE

RELATED APPLICATION

This application is a continuation of pending U.S. patent application Ser. No. 09/206,793, filed Dec. 07, 1998 now U.S. Pat. No. 6,181,638. This application hereby claims priority under 35 U.S.C § 120 to U.S. patent application Ser. No. 09/206,793. The subject matter of this application is also related to the subject matter in U.S. patent application Ser. No. 09/206,454, filed Dec. 12, 1998, and U.S. patent application Ser. No. 09/705,494, filed Nov. 3, 2000.

BACKGROUND

1. Field of the Invention

The present invention relates to memory systems for computers, and more particularly to the design of a memory interface that receives data and a clock signal from a memory during a read operation.

2. Related Art

As processor speed continually increase, memory systems are under increasing pressure to provide data at faster rates. This has recently led to the development of new memory system designs. Memory latencies have been dramatically decreased by using page mode and extended data out (EDO) memory designs, which achieve a high burst rate and low latencies within a single page of memory. Another recent innovation is to incorporate a synchronous clocked interface into a memory chip, thereby allowing data from within the same page of memory to be clocked out of the memory in a continuous stream. Such memory chips, with clocked interfaces are known as synchronous random access memories.

Recently, standards such as Rambus and SyncLink have been developed to govern the transfer of data between memory and processor using such clocked interfaces. SyncLink, which will be known as IEEE Standard 1596.7, specifies an architecture that supports a 64 M-bit memory with a data transfer rate of 1.6 gigabytes per second. SyncLink packetizes and pipelines the address, command and timing signals, and adds features that significantly increase data bus speed, thereby providing fast memory accesses without losing the ability to move quickly from row to row or to obtain bursts of data.

During read operations, synchronous random access memories return a data clock signal along with the data; this data clock signal is used to clock the data into the processor (or into a memory controller attached to the processor). This feature is a significant difference from conventional memory systems, which rely on the system clock to receive data during read operations.

Designing an interface that receives a high-speed data clock from a synchronous random access memory during a read operation presents challenges because at some point data returned during a read operation must be transferred from the high speed data clock domain into the slower speed system clock domain. This is hard to accomplish because the slower speed circuitry must somehow be able to match the data transfer rate of the high-speed circuitry. Additionally, the slower speed circuitry typically requires more setup and hold time for memory elements than is provided by the high-speed circuitry.

What is needed is a system that receives data along with an associated high-speed clock from a memory during a read operation, and that transfers this data into circuitry that is clocked by a slower system clock.

SUMMARY

One embodiment of the present invention provides a method for receiving data from a synchronous random access memory. This method receives a stream of data along with a data clock signal from the synchronous random access memory. This stream of data is alternately clocked into a first memory register and a second memory register using the data clock signal. At the same time, data is alternately clocked from the first memory register into a first system register, and from the second memory register into a second system register using a slower-speed system clock. These data transfers are coordinated so that data transfers from the synchronous random access memory into the memory registers do not interfere with data transfers from the memory registers into the system registers. More specifically, the method ensures that the first memory register is loaded from the synchronous random access memory while the data is being transferred from the second memory register into the second system register. On alternate cycles the method ensures that the second memory register is loaded from the synchronous random access memory while data is being transferred from the first memory register into the first system register. In a variation on this embodiment, the first and second memory registers are composed of a plurality of separately-clocked data words.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Computer System

Figure 1:
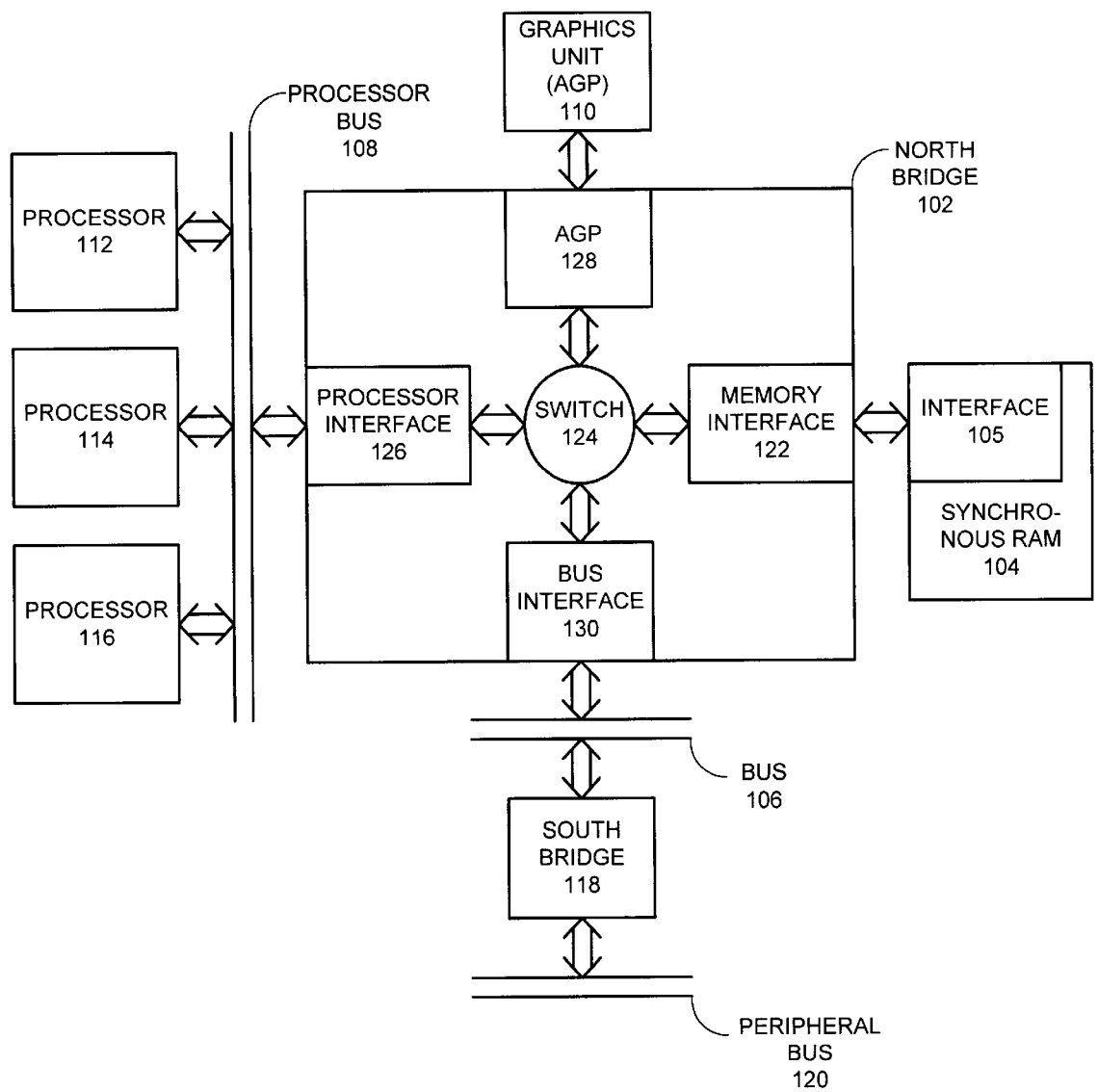
FIG. 1 illustrates a computer system including a synchronous random access memory in accordance with an embodiment of the present invention.

FIG. 1 illustrates a computer system including a synchronous random access memory in accordance with an embodiment of the present invention. The computer system illustrated in FIG. 1 includes processors 112, 114 and 116, which are coupled to processor bus 108. Processor 112, 114 and 116 may be any type of general or special purpose processors, including, but not limited to microprocessors, mainframe computers, digital signal processors, graphics processors and device controllers. Processor bus 108 may be any type of communication channel for coupling a processor to other devices in a computer system, including peripheral devices, memory devices and other processors.

North bridge 102 couples processor bus 108 to synchronous random access memory (synchronous RAM) 104, graphics unit 110 and bus 106. As illustrated in FIG. 1, north bridge 102 contains processor interface 126 for communicating with processor bus 108, accelerated graphics port (AGP) 128 for communicating with graphics unit 110, memory interface 122 for communicating with synchronous RAM 104 and bus interface 130 for communicating with bus 106. Interfaces 126, 128, 122 and 130 are coupled together through switch 124, which can be any type of switching circuitry that is able to selectively couple together to interfaces 126, 128, 122 and 130.

Synchronous RAM 104 may be any type of memory with a clocked interface that returns data with a clock signal for latching the data during read operations. This may include memory implementing the SyncLink interface standard. In some embodiments, synchronous RAM 104 includes a plurality of banks of memory, each of which includes a plurality of memory chips. As illustrated in FIG. 1, synchronous RAM 104 includes interface 105, which interacts with memory interface 122 in north bridge 102 to send data to and from north bridge 102.

Graphics unit 110 can include any special-purpose circuitry for performing graphics operations. This allows graphics computations to be off-loaded from processors 112, 114 and 116.

Bus 106 couples north bridge 102 to south bridge 118. Bus 106 may include any type of communication channel for coupling a north bridge 102 to other devices in a computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120. Peripheral bus 120 may be any type of communication channel for coupling a south bridge 118 to other devices in a computer system, including peripheral devices and memory devices. In one embodiment of the present invention, peripheral bus 120 is an ISA bus.

During operation, the system illustrated in FIG. 1 operates as follows. A processor, such as processor 112, performs a read operation. This read operation is relayed across processor bus 108 and into memory interface 122 within north bridge 102. Memory interface 122 sends a read request to interface 105 within synchronous RAM 104. Interface 105 returns data and an associated data clock signal to memory interface 122. This data clock signal is used to clock the data into memory interface 122. Next, the read operation is completed by transferring data across processor bus 108 to processor 112.

Description of Receiving Circuitry

Figure 2:
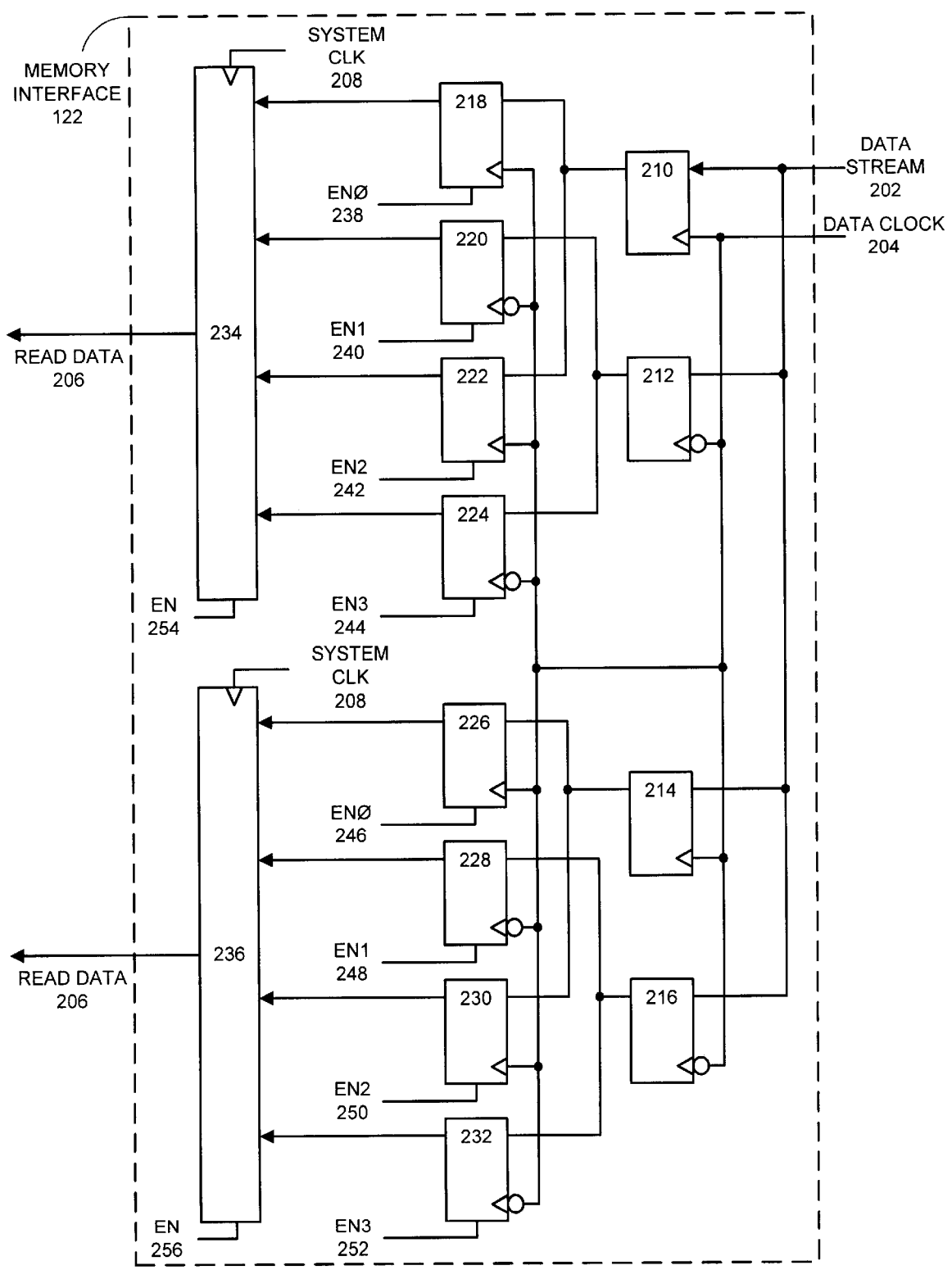
FIG. 2 illustrates a circuit for receiving data and a data clock signal from a synchronous random access memory in accordance with an embodiment of the present invention.

FIG. 2 illustrates a circuit for receiving data and a data clock signal from a synchronous random access memory in accordance with an embodiment of the present invention. This circuit resides within memory interface 122 within north bridge 102 in the system illustrated in FIG. 1. The circuit illustrated in FIG. 2 receives data stream 202 and data clock 204 from synchronous RAM 104 from FIG. 1. The circuit uses data clock 204 to latch data stream 202 into registers 218 through 232, and then transfers the data into registers 234 and 236, which are clocked by system clock 208. The data is then transferred across north bridge 102 and processor bus 108 to the processor that initiated the read operation.

More specifically, the illustrated circuit operates in two phases. During a first phase, data stream 202 is latched into registers 218, 220, 222, and 224 using data clock 204 in the upper half of the circuit illustrated in FIG. 2, while data from registers 226, 228, 230 and 232 is latched into register 236 using the system clock in the lower half of the circuit. During a second phase, data from registers 218, 220, 222 and 224 is latched into register 234 using the system clock, while data stream 202 is latched into registers 226, 228, 230, and 232 using data clock 204. By alternating the loading of registers in this way, the slower speed system clock is allowed sufficient set up and hold time to latch data into registers 234 and 236.

Note that in loading registers 218, 220, 222 and 224 during the first phase, data stream 202 first passes through registers 210 and 212. More specifically, data from register 210 passes into registers 218 and 222, and data from register 212 passes into registers 220 and 224. Note that registers 210, 218 and 222 are triggered by the rising edge of data clock 204, and registers 212, 220 and 224 are triggered by the falling edge of data clock 204. During the loading process, registers 218, 220, 222 and 224 are selectively enabled by enable signals 238, 240, 242 and 244, so that corresponding registers 218, 220, 222 and 224 are loaded in sequential order. The above discussion within this paragraph also applies to loading registers 226, 228, 230 and 232 during the second phase, so this discussion will not be repeated.

System clock 208 triggers both registers 234 and 236. These registers are selectively enabled by enable signals 254 and 256 so that register 236 loads during the first phase and register 234 loads during the second phase.

In the circuit illustrated in FIG. 1, data clock 204 is twice as fast as system clock 208. Since data is loaded on both rising and falling edges of data clock 204, the effective data clock rate is four times as fast. For example, system clock 208 might run at 100 MHz while data clock 204 runs at 200 MHz. At 200 MHz, there are 2.5 nanoseconds between rising and falling edges of data clock 204. To accommodate this difference in speed, registers 234 and 236 are four times wider than registers 218 through 232. For example, registers 234 and 236 might be 128 bits in size while registers 218 through 232 are 32 bits in size.

Note that the circuit illustrated in FIG. 1 can be expanded to provide for different ratios between the speeds of data clock 204 and system clock 208. For example, if data clock 204 increases to four times the speed of system clock 208, the system can be expanded in two ways. Registers 234 and 236 can be doubled in size to 256 bits so that they each accommodate data from eight 32-bit registers. Alternatively, the upper and lower halves of the circuit illustrated in FIG. 2 can be expanded into four units so that four 128-bit registers are each fed by four 32-bit registers.

Description of Timing Relationships Between Control Signals

Figure 3:
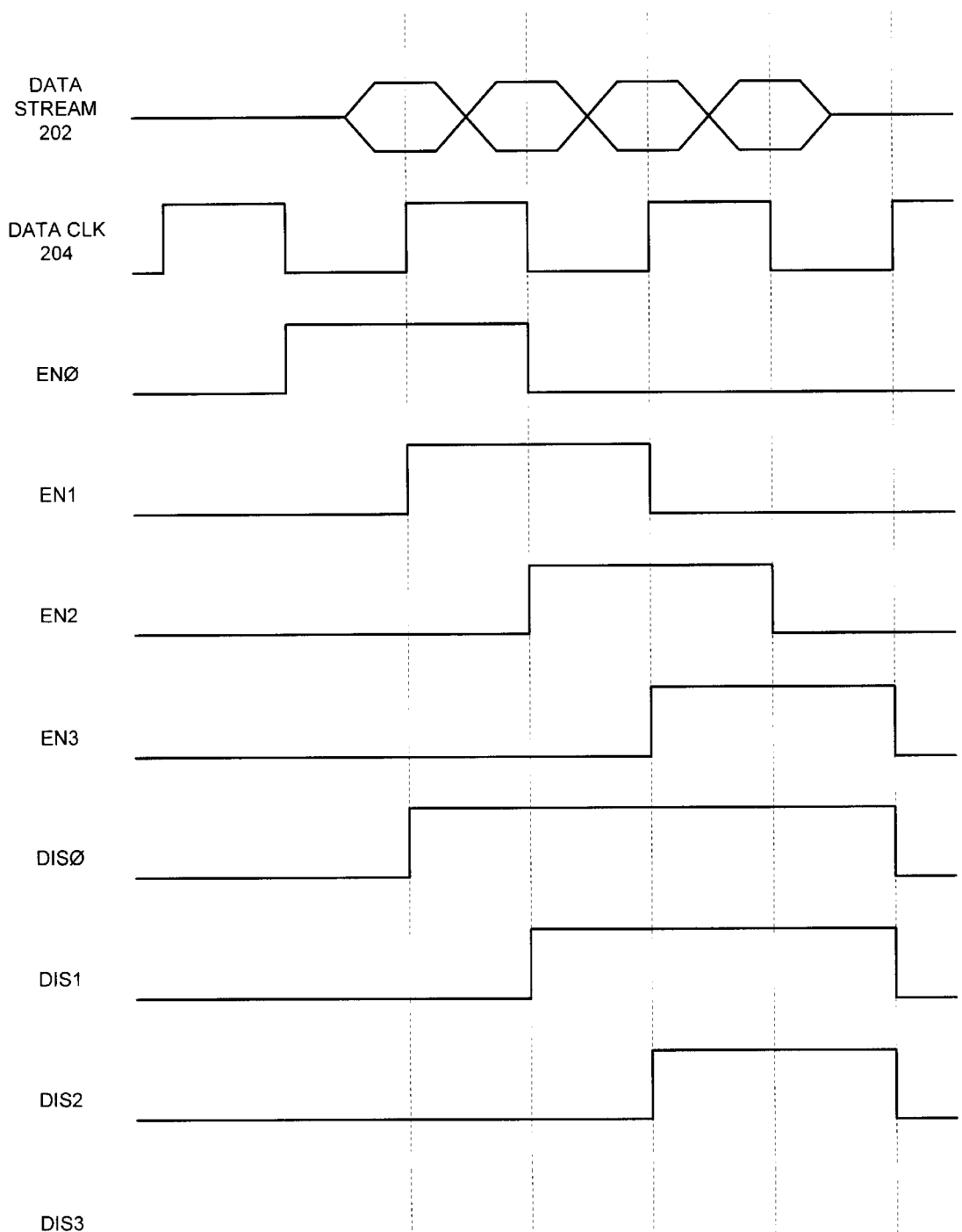
FIG. 3 is a timing diagram illustrating relationships between control signals in the circuitry illustrated in FIG. 2 in accordance with an embodiment of the present invention.

FIG. 3 is a timing diagram illustrating relationships between control signals in the circuitry illustrated in FIG. 2 in accordance with an embodiment of the present invention. Recall that the enable signals feeding into the various registers of FIG. 2 control the sequencing of data through the circuit illustrated in FIG. 2. The circuitry that generates the enable signals receives data stream 202 along with data clock 204. As illustrated in FIG. 2, data clock 204 is aligned so that it captures the stable regions in data stream 202.

Immediately below data stream 202 and data clock 204 are four enable signals, en0, en1, en2 and en3. Referring the FIG. 2, these enable signals correspond to enable signals 238, 240, 242 and 244, which latch data stream 202 into registers 218, 220, 222 and 224, respectively, during the first phase. These enable signals additionally correspond to enable signals 246, 248, 250 and 252, which latch data stream 202 into registers 226, 228, 230 and 232, respectively, during the second phase.

Enable signals en0, en1, en2 and en3 are generated so that they latch successive data words from data stream 202 into registers 218, 220, 222 and 224. To this end, en0 is centered on a rising edge of data clock 204; en1 is centered on the next falling edge; en2 is centered on the next rising edge; and e3 is centered on the next falling edge.

Alternatively, the system can work with disable signals. When disable signals are used, registers, such as registers 218 through 232 from FIG. 2, continually latch new data until they are disabled. The advantage of using a disable signal is that it can be generated after the data has been latched into the register by the clock signal. This gives the circuitry time to generate a disable signal in response to a clock signal. Otherwise, a complicated system of delays is required to generate an enable signal in response to a change in data clock 204, and to then use the enable signal to enable a register to be latched by the change in data clock 204.

To this end, dis0 disables a first register after a rising edge in data clock 204; dis1 disables a second register after the next falling edge, dis2 disables a third register after the next rising edge, and dis3 does not need to perform any disabling.

Not shown in FIG. 3 is what happens to enable and disable signals during alternate phases of the data transfer process. During an alternate phase, the contents of registers 218, 220, 222 and 224 remain unchanged while data is being transferred to register 234. For the registers to remain unchanged, enable signals en0, en1, en2 and en3 must remain at an unasserted level, whereas disable signals dis0, dis1, dis2 and dis3 must remain at an asserted level.

Description of Circuit for Generating Enable or Disable Signals

Figure 4:
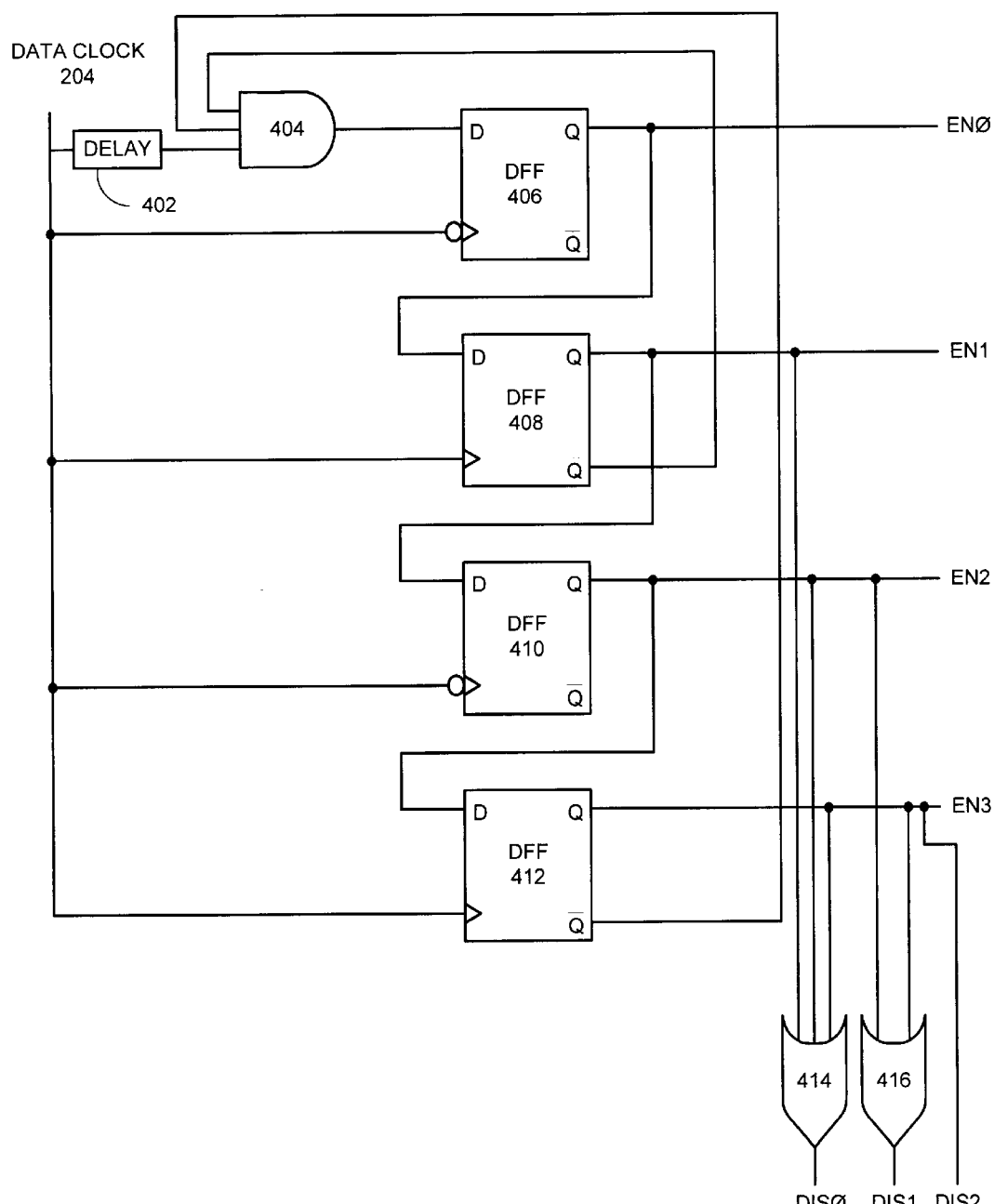
FIG. 4 illustrates circuitry for generating the enable or disable signals for the circuitry illustrated in FIG. 2 in accordance with an embodiment of the present invention.

FIG. 4 illustrates circuitry for generating the enable or disable signals for the circuit illustrated in FIG. 2 in accordance with an embodiment of the present invention. The circuitry illustrated in FIG. 4 moves data clock 204 through a chain of D flip-flops to generate the sequence of enable and disable signals illustrated in FIG. 3. More specifically, data clock 204 feeds through delay element 402 and AND-gate 404 into the input of D-flip-flop (DFF) 406, which is clocked by the falling edge of data clock 204. The output of DFF 406 feeds into the input of DFF 408, which is clocked by the rising edge of data clock 204. The output of DFF 408 feeds into the input of DFF 410, which is clocked by the falling edge of data clock 204. Finally, the output of DFF 410 feeds into the input of DFF 412, which is clocked by the rising edge of data clock 204.

AND-gate 404 takes in two additional inputs from the inverse outputs of DFF 408 and DFF 412. This ensures that only a single pulse at a time is propagated through DFFs 406, 408, 410 and 412. Finally, the outputs of DFFs 406, 408, 410 and 412 are used as enable signals en0, en1, en2 and en3, respectively.

Referring to FIG. 3, disable signals dis0, dis1, dis2 and dis3 are formed by ORing together enable signals en1, en2 and en3. More specifically, dis0 is generated by passing en1, en2 and en3 through OR-gate 414, dis1 is generated by passing en2 and en3 through OR-gate 416, dis2 is the same as en3, and dis3 remains unasserted.

Note that the above enable and disable signals can be ANDed or ORed (not shown) with enable signals 254 and 256 from FIG. 2, so that enable signals en0, en1, en2 and en3 remain at an unasserted level during alternate phases, and so that disable signals dis0, dis1, dis2 and dis3 remain at an asserted level during alternate phases.

Description of Process of Receiving Data

Figure 5:
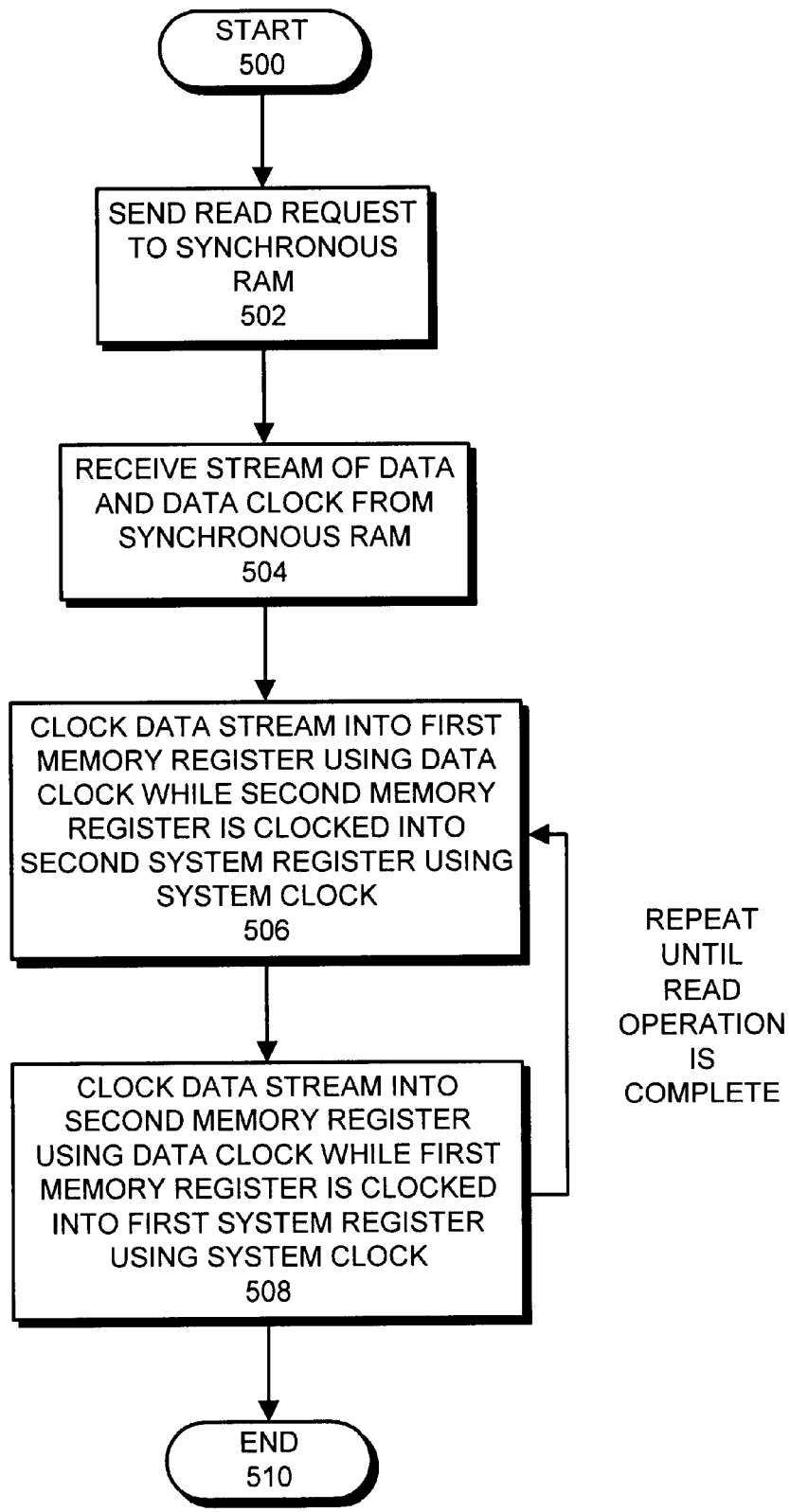
FIG. 5 is a flow chart illustrating the process of receiving data in the circuitry illustrated in FIG. 2 in accordance with an embodiment of the present invention.

FIG. 5 is a flow chart illustrating the process of receiving data in the circuitry illustrated in FIG. 2 in accordance with an embodiment of the present invention. The system starts by sending a read request to synchronous RAM 104 in FIG. 1 (state 502). The system next receives data stream 202 and data clock 204 when they are returned from synchronous RAM 104 (state 504).

Next, the system enters a first phase where data stream 202 is clocked into a first memory register using data clock 204, while the contents of a second memory register is clocked into a second system register using system clock 208 (state 506). In FIG. 2, this corresponds to data stream 202 being clocked into registers 218, 220, 222 and 224 (which correspond to the first memory register), while data is being clocked from registers 226, 228, 230 and 232 (which correspond the second memory register) into register 236 (which corresponds to the second system register).

Next, the system enters a second phase where data stream 202 is clocked into a second memory register using data clock 204, while the contents of the first memory register is clocked into a first system register using system clock 208 (state 508). In FIG. 2, this corresponds to data stream 202 being clocked into registers 226, 228, 230 and 232 (which correspond to the first memory register), while data is being clocked from registers 218, 220, 222 and 224 (which correspond the first memory register) into register 234 (which corresponds to the first system register). The above states 506 and 508 are repeated until the read operation is complete.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for receiving data from a storage device, comprising:

receiving a stream of data from the storage device, wherein the storage device is capable of supporting burst transfers of data;

receiving a data clock signal from the storage device for clocking the stream of data;

clocking the stream of data into a first memory register using the data clock signal;

clocking the stream of data into a second memory register using the data clock signal;

wherein the stream of data is clocked into the first memory register and the second memory register on both a rising and a falling edge of the data clock signal; and clocking a contents of the first memory register into a first system register using a system clock signal while the stream of data is being clocked into the second memory register.

2. The method of claim 1, wherein the first memory register includes a plurality of separately-clocked data words, and clocking the stream of data into the first memory register involves sequentially clocking the stream of data into successive words in the plurality of separately-clocked data words.

3. The method of claim 2, wherein the plurality of separately-clocked data words are coupled to a plurality of word enable signals that work in concert with the data clock signal to provide sequential clocking, the plurality of word enable signals being generated by a shift register.

4. The method of claim 2, wherein the plurality of separately-clocked data words are coupled to a plurality of word disable signals that work in concert with the data clock signal to provide sequential clocking, the plurality of word disable signals being generated in response to changes in the data clock signal.

5. The method of claim 1, wherein the system clock signal is slower than the data clock signal.

6. The method of claim 1, further comprising clocking a contents of the second memory register into a second system register using the system clock signal.

7. The method of claim 1, wherein receiving the stream of data from the storage device includes receiving a burst transfer of the stream of data from a random access memory.

8. The method of claim 1, wherein the act of receiving the stream of data includes receiving the stream of data at a memory controller coupled to a processor.

9. The method of claim 1, wherein the act of receiving the stream of data includes receiving the stream of data at a processor.

10. The method of claim 1, further comprising:
clocking the stream of data into a third memory register using the data clock signal;
clocking the stream of data into a fourth memory register using the data clock signal;
clocking a contents of the third memory register into a third system register using the system clock signal while the stream of data is being clocked into the fourth memory register; and
clocking a contents of the fourth memory register into a fourth system register using the system clock signal;
wherein the act of clocking a contents of the second memory register into a second system register occurs while the stream of data is being clocked into the third memory register.

11. The method of claim 10, wherein the act of clocking a contents of the third memory register into the third system register occurs while the stream of data is being clocked into the fourth memory register.

12. The method of claim 1, further comprising calibrating a skew between the stream of data and the data clock signal by sending configuration information to the storage device.

13. A method for receiving data from a storage device, comprising:

receiving a stream of data from the storage device, wherein the storage device is capable of supporting burst transfers of data;
receiving a data clock signal from the storage device for clocking the stream of data;
clocking the stream of data into a first memory register using the data clock signal, wherein the first memory register includes a plurality of separately-clocked data words, and clocking the stream of data into the first memory register involves sequentially clocking the stream of data into successive words in the plurality of separately-clocked data words, the plurality of separately-clocked data words being coupled to a plurality of word enable/disable signals that work in concert with the data clock signal to provide the sequential clocking;
clocking the stream of data into a second memory register using the data clock signal; and
clocking a contents of the first memory register into a first system register using a system clock signal while the stream of data is being clocked into the second memory register.

14. The method of claim 13, wherein the act of sequentially clocking the stream of data into successive words includes clocking successive words on alternating rising and falling edges of the data clock signal.

15. The method of claim 13, wherein clocking the stream of data into the first memory register includes using both rising and falling edges of the data clock signal to clock the first memory register.

16. The method of claim 13, wherein the system clock signal is slower than the data clock signal.

17. The method of claim 13, further comprising clocking a contents of the second memory register into a second system register using the system clock signal.

18. The method of claim 13, further comprising:
clocking the stream of data into a third memory register using the data clock signal;
clocking the stream of data into a fourth memory register using the data clock signal;
clocking a contents of the third memory register into a third system register using the system clock signal while the stream of data is being clocked into the fourth memory register; and
clocking a contents of the fourth memory register into a fourth system register using the system clock signal;
wherein the act of clocking a contents of the second memory register into a second system register occurs while the stream of data is being clocked into the third memory register.

19. The method of claim 13, further comprising calibrating a skew between the stream of data and the data clock signal by sending configuration information to the storage device.

20. The method of claim 13, further comprising transmitting a stream of data to the storage device.

* * * * *